United States Patent [19]

Tamura et al.

[11] Patent Number: 4,709,264

[45] Date of Patent: Nov. 24, 1987

[54] PICTURE PROCESSING APPARATUS

[75] Inventors: Masafumi Tamura, Yokohama; Arisa Uchiyama, Tokyo; Takashi Kondo; Satoshi Kageyama, both of Yokohama, all of Japan

[73] Assignee: Kabushiki Kaisha Toshiba, Kawasaki, Japan

[21] Appl. No.: 914,453

[22] Filed: Oct. 1, 1986

[30] Foreign Application Priority Data

Oct. 2, 1985 [JP] Japan .................................. 60-217966

[51] Int. Cl.$^4$ ............................................. H06N 7/18
[52] U.S. Cl. ....................................... 358/93; 340/937; 358/105; 358/107; 358/222
[58] Field of Search ................. 358/107, 93, 105, 222, 358/140, 160; 340/937, 936; 346/330, 107 UP

[56] References Cited

U.S. PATENT DOCUMENTS

| | | | |
|---|---|---|---|
| 3,890,463 | 6/1975 | Ikegami | 358/93 |
| 4,214,265 | 7/1980 | Olesen | 358/107 |
| 4,303,945 | 12/1981 | Fawcett | 358/222 |
| 4,476,494 | 10/1984 | Tugaye | 358/222 |
| 4,562,468 | 12/1985 | Koga | 358/136 |

OTHER PUBLICATIONS

Netravali et al., "Motion-Compensated Television Coding: Part", Bell Systems Tech. J., vol. 58, pp. 631–670, Mar. 1979.

Primary Examiner—Howard W. Britton
Attorney, Agent, or Firm—Finnegan, Henderson, Farabow, Garrett & Dunner

[57] ABSTRACT

Disclosed is a picture processing apparatus comprising image pickup for taking a picture of an object and outputting picture information in the interlace system, picture information storage device for storing a first field picture information and a second field picture information outputted from the image pickup, speed detecting apparatus for detecting a moving speed of the object picked up by the image pickup, read-address correction circuitry for relatively correcting the address and for reading the first and second field picture information stored in the picture information storage device in accordance with the moving speed of the object detected by the speed detecting apparatus, and picture composition circuitry for composing the first field picture information and the second field picture information outputted from the picture information storage device after address correction. This enables obtaining an accurate frame picture without discrepancy owing to the moving speed of the moving object between field pictures.

18 Claims, 4 Drawing Figures

PICTURE PROCESSING APPARATUS

The present application claims priority of Japanese patent application No. 60-217966 filed on Oct. 2, 1985.

FIELD OF THE INVENTION AND RELATED ART STATEMENT

The present invention relates generally to a picture processing apparatus which corrects a picture of a moving object picked up by an image pick up device outputting picture information in the interlace system.

Conventionally, the picture information output of a television camera has been achieved according to the interlace system which successively outputs a first field picture and a second field picture.

The interlace system would suffer no problem as long as a picture of a stationary object is taken. However, when taking a picture of a moving object, the interlace system causes a picture discrepancy due to the moving speed of the moving object. More specifically, when a object moves in the right direction as shown in FIG. 4, the frame picture of a partial area B shown in FIG. 4(a) is such that a first field picture as shown in FIG. 4(b) and a second field picture as shown in FIG. 4(c) are superposed, resulting in a picture with discrepancy in line units as shown in FIG. 4(d).

Accordingly, in the conventional picture processing apparatus, when performing a picture processing in terms of a moving object, the picture processing is effected only using either of the first field picture or the second field picture and therefore there is a problem in which the resolution in the vertical direction decreases to $\frac{1}{2}$.

OBJECT AND SUMMARY OF THE INVENTION

The present invention has been developed in order to remove the above-mentioned problem inherent in the conventional picture processing apparatus, and it is therefore an object of this invention to provide a picture processing apparatus which is capable of obtaining accurate picture information without producing the discrepancy due to the moving speed of a moving object between field pictures.

Therefore, a picture processing apparatus according to the present invention comprises image pickup means for taking a picture of an object and outputting picture information in the interlace system, picture information storage means for storing a first field picture information and a second field picture information outputted from the image pickup means, speed detecting means for detecting a moving speed of the object picked up by the image pickup means, read-address correction means for relatively correcting the addresss for reading the first and second field picture information stored in the picture information storage means in accordance with the moving speed of the object detected by the speed detecting means, and picture composition means for composing the first field picture information and second field picture information outputted from the picture information storage means after address correction. This enables obtaining an accurate frame picture without discrepancy owing to the moving speed of the moving object between field pictures.

DESCRIPTION OF PREFERRED EMBODIMENT

An embodiment of the present invention will be hereinbelow described in detail with reference to the drawings.

Figure 1:
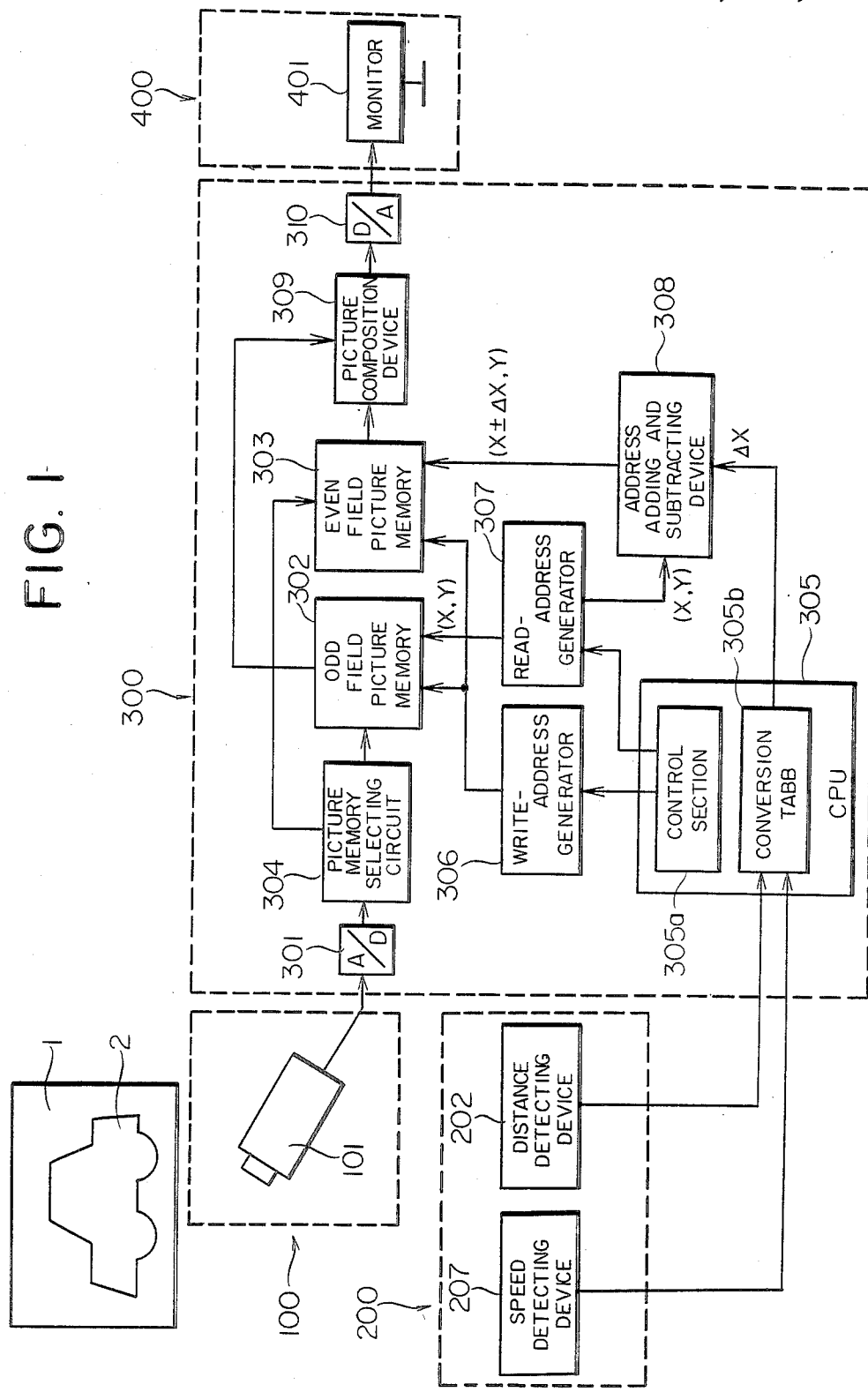
FIG. 1 is a block diagram showing the arrangement of a picture processing apparatus according to an embodiment of this invention.

FIG. 1 is a block diagram showing the arrangement of a picture processing apparatus according to an embodiment of the present invention.

This picture processing apparatus comprises an image pickup section 100, a speed-and-distance detecting section 200, a picture processing section 300, and a monitor section 400.

The image pickup section 100 comprises a television camera 101 which in turn takes a picture of a moving object 2 (for example, motor vehicle) advanced into a predetermined area 1 and outputs an analog picture information in the interlace system in which a first field picture and a second field picture are successively outputted.

Figure 2:
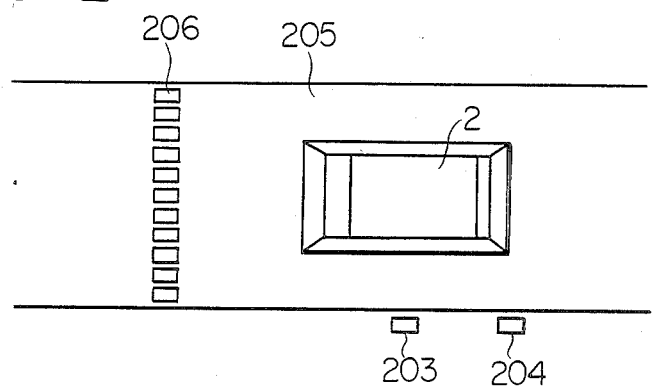
FIG. 2 is an illustration for describing one examples of a speed detecting device and distance detecting device employed in this embodiment.

The speed-and-distance detecting section 200 comprises a speed detecting device 201 and a distance detecting device 202. The speed detecting device 201 measures the moving speed of the moving object 2 in the area 1 and includes means for determining whether the moving object 2 is present in the area 1 and means for determining the moving direction of the moving object 2. For example, the speed detecting device 201 is arranged such that to detect the moving speed of the moving object 2 an ultrasonic wave is emmitted thereto and the Doppler shift frequency of the reflected wave is detected. Furthermore, it is also appropriate to be arranged such that, as shown in FIG. 2, detectors 203 and 204 are disposed at a predetermined interval to detect the passage of the moving object 2 and the moving speed is obtained on the basis of the time difference between the detections performed by the detectors 203 and 204. It is further appropriate to detect the moving speed using other known techniques.

The distance detecting device 202 measures a distance between the television camera 101 and the moving object 2 in the area 1. For example, when the moving object 2 is a motor vehicle, the distance detecting device 202 is arranged, as shown in FIG. 2, a plurality of detectors 206, each transmitting a signal distinguishable from the others when a tire of the moving object (motor vehicle) 2 steps thereon, are buried in a road 205 in the direction perpendicular to the advancing direction of the moving object (motor vehicle) 2 and the distance between the moving object 2 and the end of the road 205, i.e., the distance between the moving object 2 and the television camera 101, is measured on the basis of a signal transmitted from one of the detectors 206 on which the moving object 2 steps. It is also appropriate to be arranged such that an ultrasonic transmitter and an ultrasonic receiver are disposed in the vicinity of the television camera 101 to allow an ultrasonic pulse from the ultrasonic transmitter to be received by the ultrasonic receiver after reflection on the moving object 2 and the distance between the moving object 2 and the television 101 is measured on the basis of the time difference between the time the ultrasonic pulse is transmitted by the ultrasonic transmitter and the time the ultrasonic pulse is received by the ultrasonic receiver. It is further appropriate to detect the distance using other known techniques.

The picture processing section 300 processes picture information from the image pickup section 100 on the basis of information from the speed-and-distance detecting section 200, and comprises an A/D converter 301, and ODD field picture memory 302, an EVEN field picture memory 303, a picture memory selecting circuit 304, a central processing unit (CPU) 305, a write-address generator 306, a read-address generator 307, an address adding-and-subtracting device 308, a picture composition device 309, and a D/A converter 310.

The A/D converter 301 converts analog picture information in the interlace system from the television camera 101 into digital picture information.

The ODD field picture memory 302 stores a first field picture information from the digital picture information transmitted by the A/D converter 301.

The EVEN field picture memory 303 stores a second field picture information from the digital picture information transmitted by the A/D converter 301.

The picture memory selecting circuit 304 selects the ODD field picture memory 302 and EVEN field memory 303, respectively, to the first field picture information and the second field picture information from the digital picture information sent from the A/D converter 301, and supplies the first and second field information, respectively, to the ODD field picture memory 302 and the EVEN field picture memory 303.

The write-address generator 306 generates a write-address signal for the writing of the first and second field picture information sent from the picture memory selecting circuit 304 into the ODD field picture memory 302 and the EVEN field picture memory 303, in accordance with a control signal from the central processing unit (CPU) 305.

The read-address generator 307 generates a read-address signal for the reading of the first and second field picture information from the ODD field picture memory 302 and the EVEN field picture memory 303, in accordance with a control signal from the central processing unit (CPU) 305.

The central processing unit (CPU) 305, as described above, includes a control section 305a for supplying the control singnals to the write-address generator 306 and the read-address generator 307 to generate the write-address signal and read-address signal and a conversion table 305b for obtaining an address correction amount, i.e., an address for reading the second field picture information stored in the EVEN field picture memory 303 in accordance with speed information obtained by the speed detecting device 201 and distance information obtained by the distance detecting device 202. The address correction amount is a function of the speed information from the speed detecting device 201 and the distance information from the distance detecting device 202. The function is predetermined by taking a picture of the object 2 moving at a known speed and separated by a known distance from the television camera, and is established so as not to produce a discrepancy between the first field picture information and the second field picture information when the first field picture information read from the ODD field picture memory 302 and the second field picture information read from the EVEN field picture memory 303 are composed in the picture composition device which will be described hereinlater.

The address adding and-subtracting device 308 performs the addition or subtraction between the address correction amount from the conversion table 305b and the address signal supplied from the read-address generator 307 to the EVEN field picture memory.

The picture composition device 309 performs the composition of the first field picture information read from the ODD field picture memory 302 and the second field picture information read from the EVEN field picture memory 303.

The D/A converter 310 converts the digital picture information composed by the picture composition device 309 into analog picture information.

The monitor section 400 comprises a television monitor 401 and indicates analog pictures on the bases of the analog picture information sent from the D/A converter 310 of the picture processing section 300.

Secondly, one example of the series operation of the picture processing apparatus thus arranged will be described where a picture of the tire portion of an motor vehicle, i.e., moving object 2, is taken and picture information obtained thereby is processed.

An area 1 for detecting the tire portion 2 of a motor vehicle (which will be referred to as moving object 2) is first established.

The speed detecting device 201 checks whether the moving object 2 is present in the area 1. If the moving object 2 is present therein, the moving speed of the moving object 2 is obtained. The obtained speed information is supplied to the conversion table 305b of the central processing unit (CPU) 305.

At this time, the moving object 2 is image-picked up by the television camera 101 and at the same time the distance between the moving object 2 and the television camera 101 is measured. The measured distance information, as well as the speed information obtained by the speed detecting device 202, is supplied to the conversion table 305b of the central processing unit (CPU) 305.

On the other hand, the analog information obtained by the television camera 101 is converted by the A/D converter 301 into digital picture information. The digital picture information is fed to the picture memory selecting circuit 304, and a first field picture information is stored in the ODD field picture memory 302 while a second field picture information is stored in the EVEN field picture memory 303, the storages being respectively performed in accordance with an address signal generated by the write-address generator 306.

The conversion table 305b of the central processing unit (CPU) 305 obtains an address correction amount $\Delta X$ to correct the address for reading the second field picture information stored in the EVEN field picture memory 303 on the basis of the speed information from the speed detecting device 201 and the distance information from the distance detecting device 202.

Here, the read-address generator 307 generates (X, Y), (X+1, Y), ---, (X+n, Y), (X, Y+1), ---, (X+n, Y+1), ---, (X+n, Y+n) as read-address signal. The first field picture information stored in the ODD field picture memory 302 is read by the above address signal.

On the other hand, the second field picture information stored in the EVEN field picture memory 303 is read in accordance with the address signal, i.e., $(X \pm \Delta X, Y)$, $(X+1 \pm \Delta X, Y)$, ---, $(X+n \pm \Delta X, Y)$, $(X \pm \Delta X, Y+1)$, ---, $(X+n \pm \Delta X, Y+1)$, --- $(X+n \pm \Delta X, Y+n)$, which is obtained by adding or subtracting the address correction amount $\Delta X$ obtained by the conversion table 305a to the read-address signal generated by the read-address generator 307.

The determination with respect to the addition or subtraction of the address correction amount $\Delta X$ performed by the address adding-and-subtracting device 308 is made in accordance with the advancing direction of the moving body 2.

Figure 3:
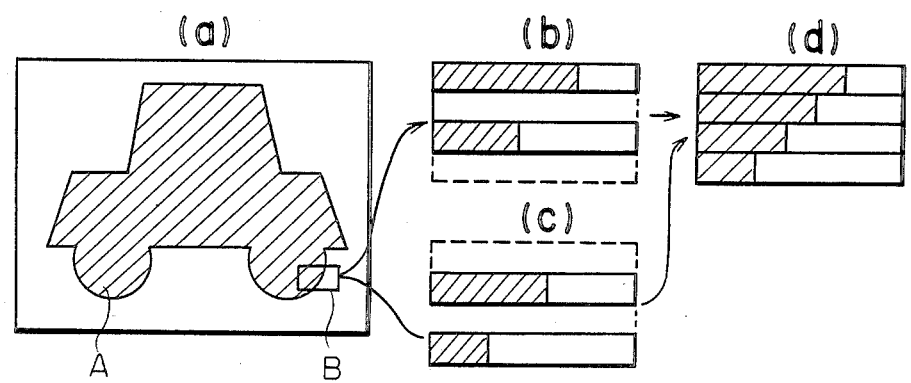
FIG. 3 is an illustration for describing a frame picture after address correction of a second field picture in this embodiment.
Figure 4:
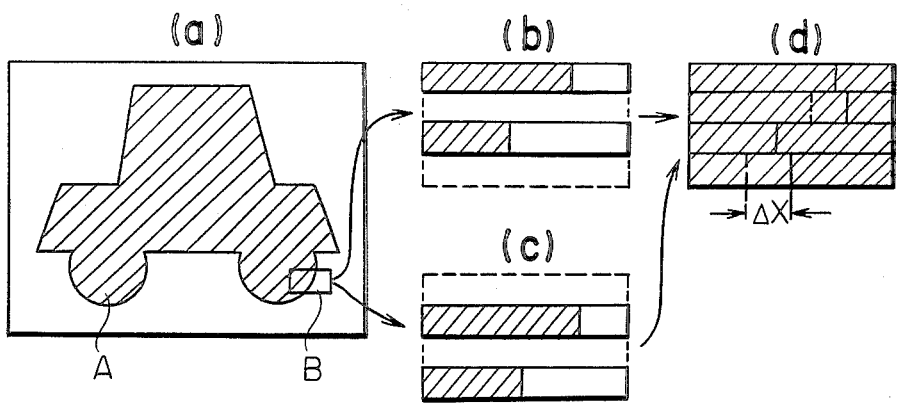
FIG. 4 is a diagram useful for describing a frame picture of a moving object in a conventional interlace system.

The first field picture information and the second firld picture information thus read from the ODD field picture memory 302 and the EVEN field picture memory 303, as shown in FIG. 3, are composed by the picture composition device 309 to obtain frame picture information without position discrepancy, the first field picture information being shown in FIG. 3(b), the second field picture information being shown in FIG. 3(c), and the frame picture information being shown in FIG. 3(d). The frame picture information is converted by the D/A converter 301 into the analog picture information and is indicated as an analog picture on the television monitor 401.

Thus, an accurate frame picture without discrepancy between the first and second field pictures can be indicated on the television monitor 401.

Furthermore, the speed detecting apparatus can be arranged, for example, such that a plurality of first field pictures or a plurality of second field pictures are accumulated in a picture memory and speed can be obtained by performing a picture operation process of the moving amount of a moving object between the same field pictures.

In addition, although in the above-described embodiment a distance detecting device is provided, when the present invention is employed, for example, for a picture processing apparatus used for product inspection in manufacturing process of electronic parts and the like, the distance detecting device will be not required because the distance between the television camera and electronic part is in advance set.

As described above, according to the present invention, the picture information of a moving object inputted in the interlace system is corrected between fields and therefore it is possible to obtain an accurate picture without discrepancy between field pictures when taking a picture of a moving body. Therefore, when performing the picture process of a moving object, the composition of the first and second field picture, i.e., frame picture, can be used instead of using either of the first or second field picture, and resulting in an accurate picture process.

What is claimed is:

1. A picture processing apparatus, comprises:
   image pickup means for taking a picture of an object and outputting picture information in the interlace system;
   picture information storage means for storing first field picture information and second field picture information outputted from said image pickup means;
   speed detecting means for detecting a moving speed of the object picked up by the image pickup means;
   read-address correction means for relatively correcting the addresses for reading the first and second field picture information stored in said picture information storage means in accordance with the moving speed of the object detected by said speed detecting means; and
   picture composition means for performing the composition of the first field picture information and the second field picture information outputted from said picture information storage means after the address correction.

2. A picture processing apparatus according to claim 1, wherein said picture information storage means comprises a first picture memory for storing the first field picture information and a second picture memory for storing the second field picture information.

3. A picture processing apparatus according to claim 1, wherein said speed detecting means is arranged to use Doppler effect.

4. A picture processing apparatus according to claim 1, wherein said speed detecting means is arranged such that speed is calculated as a function of a time period required when the object moves by a predetermined distance.

5. A picture processing apparatus according to claim 1, wherein said speed detecting means includes means for determining whether the object is present in an image pickup area established for said image pickup means.

6. A picture processing apparatus according to claim 1, wherein said speed detecting means includes means for determining the moving direction of the object.

7. A picture processing apparatus according to claim 1, wherein said speed detecting means is arranged such that speed information is obtained by processing the plurality of field pictures stored in said picture information storage means.

8. A picture processing apparatus according to claim 1, wherein said read-address correction means comprises means for calculating a correction amount on the basis of the moving speed of the object detected by said speed detecting means and means for adding the correction amount to the address for reading the first field picture information or the second field picture information from said picture information storage means and for subtracting the correction amount therefrom.

9. A picture processing apparatus, comprises:
   image pickup means for taking a picture of an object and outputting picture information in the interlace system;
   picture information storage means for storing first field picture information and second field picture information outputted from said image pickup means;
   speed detecting means for detecting a moving speed of the object picked up by the image pickup means;
   distance detecting means for detecting a distance between said object and said image pickup means;
   read-address correction means for relatively correcting the addresses for reading the first and second field picture information stored in said picture information storage means in accordance with the moving speed of the object detected by said speed detecting means and the distance between said object and said image pickup means detected by said distance detecting means; and
   picture composition means for composing the first field picture information and the second field picture information outputted from said picture information storage means after address correction.

10. A picture processing apparatus according to claim 9, wherein said picture information storage means comprises a first picture memory for storing the first field picture information and second picture memory for storing the second picture information.

11. A picture processing apparatus according to claim 9, wherein said speed detecting means is arranged to use Doppler effect.

12. A picture processing apparatus according to claim 9, wherein said speed detecting means is arranged such that speed is calculated as a function of a time period required when the object moves by a predetermined distance.

13. A picture processing apparatus according to claim 9, wherein said speed detecting means includes means for determining whether the object is present in an image pickup area established for said image pickup means.

14. A picture processing apparatus according to claim 9, wherein said speed detecting means includes means for determining the moving direction of the object.

15. A picture processing apparatus according to claim 9, wherein said speed detecting means is arranged such that speed information is obtained by processing the plurality of first field pictures or the plurality of second field pictures stored in said picture information storage means.

16. A picture processing apparatus according to claim 9, wherein said distance detecting means comprises a plurality of means disposed along a perdetermined derection for detecting the presence of said object, means for determining one of said plurality means which detects said object, and means for calculating a distance between said object and said image pickup means on the basis of the position of said detecting means determined.

17. A picture processing apparatus according to claim 9, wherein said distance detecting means comprises means for emitting ultrasonic wave to said object, means for receiving the reflected wave from said object, and means for calculating a distance between said object and said image pickup means on the basis of the time difference between the emitting and the receiving.

18. A picture processing apparatus according to claim 9, wherein said read-address correction means comprises means for calculates a correction amount on the basis of the moving speed of the object detected by said speed detecting means and the distance between said object and said image pickup means detected by said distance detecting means, and means for adding the correction amount to the address for reading the first field picture information or the second field picture information from said picture information storage means and for subtracting the correction amount therefrom.

* * * * *